US012510867B2

(12) United States Patent
Tschudy et al.

(10) Patent No.: US 12,510,867 B2
(45) Date of Patent: Dec. 30, 2025

(54) SYSTEMS AND METHODS FOR OPERATING A SURGICAL DEVICE

(71) Applicant: Covidien LP, Mansfield, MA (US)

(72) Inventors: Christopher T. Tschudy, Arvada, CO (US); Graham J. Barrett, Denver, CO (US); David J. Van Tol, Boulder, CO (US); Kristen P. Bradley, Westminster, CO (US); Keith W. Malang, Longmont, CO (US)

(73) Assignee: Covidien LP, Mansfield, MA (US)

( * ) Notice: Subject to any disclaimer, the term of this patent is extended or adjusted under 35 U.S.C. 154(b) by 478 days.

(21) Appl. No.: 17/910,395

(22) PCT Filed: Feb. 15, 2021

(86) PCT No.: PCT/US2021/018108
§ 371 (c)(1),
(2) Date: Sep. 9, 2022

(87) PCT Pub. No.: WO2021/183261
PCT Pub. Date: Sep. 16, 2021

(65) Prior Publication Data
US 2023/0121477 A1 Apr. 20, 2023

Related U.S. Application Data

(60) Provisional application No. 62/988,464, filed on Mar. 12, 2020.

(51) Int. Cl.
*G04G 13/02* (2006.01)
*G04G 15/00* (2006.01)

(52) U.S. Cl.
CPC ......... *G04G 13/026* (2013.01); *G04G 15/006* (2013.01)

(58) Field of Classification Search
CPC ..................... G04G 13/026; G04G 15/006
(Continued)

(56) References Cited

U.S. PATENT DOCUMENTS 6,383,183 B1* 5/2002 Sekino ............... A61B 18/1206
606/49
7,464,847 B2* 12/2008 Viola ............... A61B 17/07207
227/176.1
(Continued)

OTHER PUBLICATIONS

Written Opinion completed May 27, 2021 corresponding to counterpart Int'l Patent Application PCT/US21/18108.
(Continued)

*Primary Examiner* — Zhen Y Wu

(57) ABSTRACT

A method for operating a surgical device, includes: determining whether a switch has transitioned from a first condition, corresponding to a first operating mode, to a second condition, corresponding to a second operating mode; when it is determined that the switch has transitioned from the first condition to the second condition: maintaining the first operating mode for a pre-determined time; in a case where the switch remains in the second condition throughout the pre-determined time, switching to the second operating mode after expiration of the pre-determined time; and when the switch returns to the first condition during the pre-determined time, maintaining the first operating mode after expiration of the pre-determined time.

20 Claims, 7 Drawing Sheets

(58) Field of Classification Search
USPC .................................................. 340/539.12
See application file for complete search history.

(56) References Cited

U.S. PATENT DOCUMENTS

| | | | |
|---|---|---|---|
| 9,636,167 B2* | 5/2017 | Gregg | A61B 17/00 |
| 9,808,246 B2* | 11/2017 | Shelton, IV | A61B 17/07207 |
| 9,943,326 B2* | 4/2018 | Ross | A61B 17/00234 |
| 10,028,754 B2* | 7/2018 | Johnson | A61B 17/1659 |
| 10,034,704 B2* | 7/2018 | Asher | A61B 18/1206 |
| 10,568,643 B2* | 2/2020 | Johnson | A61B 17/164 |
| 10,952,788 B2* | 3/2021 | Asher | A61B 90/03 |
| 11,382,638 B2* | 7/2022 | Harris | A61B 34/76 |
| 2005/0033337 A1* | 2/2005 | Muir | A61B 18/00 606/167 |
| 2014/0236202 A1* | 8/2014 | Palmer | H01H 13/64 606/169 |
| 2016/0095616 A1* | 4/2016 | Lopez | A61B 17/320092 606/169 |
| 2016/0375273 A1 | 12/2016 | Hirai et al. | |
| 2017/0000552 A1* | 1/2017 | Asher | A61B 18/1206 |
| 2017/0281171 A1* | 10/2017 | Shelton, IV | A61B 17/1155 |
| 2017/0311974 A1* | 11/2017 | Friedrichs | A61B 17/320092 |
| 2019/0021783 A1* | 1/2019 | Asher | A61B 18/1445 |
| 2019/0038281 A1* | 2/2019 | Shelton, IV | A61B 34/70 |
| 2019/0038307 A1* | 2/2019 | Brown | A61B 17/320092 |
| 2019/0201041 A1* | 7/2019 | Kimball | A61B 34/30 |
| 2019/0239915 A1* | 8/2019 | Hibner | A61B 17/320092 |
| 2021/0236195 A1* | 8/2021 | Asher | A61B 90/03 |

OTHER PUBLICATIONS

International Preliminary Report on Patentability issued Sep. 6, 2022.
European Office Action for EP Application No. 21 710 797.8 mailed Aug. 20, 2025 (7 pages).

* cited by examiner

SYSTEMS AND METHODS FOR OPERATING A SURGICAL DEVICE

CROSS-REFERENCE TO RELATED APPLICATIONS

The present application is a U.S. National Stage Application filed under 35 U.S.C. § 371 (a) claiming the benefit of and priority to International Patent Application No. PCT/US2021/018108, filed Feb. 15, 2021, which claims the benefit of and priority to U.S. Provisional Patent Application Ser. No. 62/988,464, filed Mar. 12, 2020, the entire disclosures of each of which being incorporated by reference herein.

BACKGROUND

Technical Field

The present disclosure relates to surgical instruments and, more particularly, to ultrasonic surgical instruments and methods for operating the same.

Background of Related Art

Ultrasonic surgical instruments utilize ultrasonic energy, i.e., ultrasonic vibrations, to treat tissue. More specifically, ultrasonic surgical instruments utilize mechanical vibration energy transmitted at ultrasonic frequencies to coagulate, cauterize, fuse, seal, cut, desiccate, and/or fulgurate tissue to effect hemostasis.

Ultrasonic surgical instruments typically employ a transducer coupled to a handle of the ultrasonic surgical instrument and configured to produce ultrasonic energy for transmission along a waveguide to an end effector of the ultrasonic surgical instrument that is designed to treat tissue with the ultrasonic energy. The transducer may be driven by an ultrasonic generator that is on-board, e.g., on or within the handle of the ultrasonic surgical instrument, or remotely disposed, e.g., as a set-top box connected to the ultrasonic surgical instrument via a surgical cable. The end effector of the ultrasonic surgical instrument may include a blade that receives the ultrasonic energy from the waveguide for application to tissue and a jaw member configured to clamp tissue between the blade and the jaw member to facilitate treatment thereof.

SUMMARY

As used herein, the term "distal" refers to the portion that is described which is further from a user, while the term "proximal" refers to the portion that is being described which is closer to a user. Further, any or all of the aspects described herein, to the extent consistent, may be used in conjunction with any or all of the other aspects described herein.

Provided in accordance with aspects of the present disclosure is a method for operating a surgical device, including determining whether a switch has transitioned from a first condition, corresponding to a first operating mode, to a second condition, corresponding to a second operating mode. In a case where it is determined that the switch has transitioned from the first condition to the second condition, the method includes maintaining the first operating mode for a pre-determined time. In a case where the switch remains in the second condition throughout the pre-determined time, the method includes switching to the second operating mode after expiration of the pre-determined time. In a case where the switch returns to the first condition during the pre-determined time, the method includes maintaining the first operating mode after expiration of the pre-determined time.

In an aspect of the present disclosure, the method may further include providing an indication to a user that the second condition is initiated.

In another aspect of the present disclosure, the indication may include a tactile alert, an audio alert, and/or a visual alert.

In a further aspect of the present disclosure, the first operating mode may include a low power level, and the second operating mode may include a high power level.

Provided in accordance with aspects of the present disclosure is a method for operating a surgical device, including determining whether, within a first pre-determined time, a switch has transitioned from an off condition, through a first condition corresponding to a first operating mode, to a second condition corresponding to a second operating mode. In a case where it is determined that the switch has transitioned from the off condition through the first condition to the second condition within the first pre-determined time, the method includes outputting the second operating mode and determining whether the switch has transitioned from the second condition back to the first condition within a second pre-determined time. In a case where it is determined that the switch has transitioned from the second condition back to the first condition within the second pre-determined time, the method includes switching from the second operating mode to the first operating mode after expiration of the second pre-determined time. In a case where it is determined that the switch has not transitioned from the second condition back to the first condition within the second pre-determined time, the method includes maintaining the second operating mode after expiration of the second pre-determined time.

In an aspect of the present disclosure, the method may further include providing an indication to a user that the second condition is initiated.

In another aspect of the present disclosure, the indication may include a tactile alert, an audio alert, and/or a visual alert.

In a further aspect of the present disclosure, the first operating mode may include a low power level, and the second operating mode may include a high power level.

In an aspect of the present disclosure, the method may further include determining if the switch has transitioned from the second condition to the first condition. In a case where it is determined that the switch has not transitioned from the second condition back to the first condition the method further includes: maintaining the second operating mode. In a case where it is determined that the switch has transitioned from the second condition back to the first condition the method further includes: determining a prior duration of the first operating mode, switching from the second operating mode to the first operating mode, and adjusting the first operating mode based on the second pre-determined time.

In an aspect of the present disclosure, the method may further include providing an indication to a user that the second operating mode is initiated.

In another aspect of the present disclosure, the indication may include at least one of an audio alert or a visual alert.

In an aspect of the present disclosure, a non-transitory computer-readable medium stores instructions which, when executed by a processor, cause the processor to perform a computer-implemented method for operating a surgical device. The computer-implemented method includes determining whether, within a first pre-determined time, a switch has transitioned from an off condition, through a first condition corresponding to a first operating mode, to a second condition corresponding to a second operating mode. In a case where it is determined that the switch has transitioned from the off condition through the first condition to the second condition within the first pre-determined time, the computer-implemented method further includes: outputting the second operating mode and determining whether the switch has transitioned from the second condition back to the first condition within a second pre-determined time. In a case where it is determined that the switch has transitioned from the second condition back to the first condition within the second pre-determined time, the computer-implemented method further includes: switching from the second operating mode to the first operating mode after expiration of the second pre-determined time. In a case where it is determined that the switch has not transitioned from the second condition back to the first condition within the second pre-determined time, the computer-implemented method further includes: maintaining the second operating mode after expiration of the second pre-determined time.

In an aspect of the present disclosure, the method may further include providing an indication to a user that the second condition is initiated.

In another aspect of the present disclosure, the indication may include a tactile alert, an audio alert, and/or a visual alert.

In a further aspect of the present disclosure, the first operating mode may include a low power level, and the second operating mode may include a high power level.

In an aspect of the present disclosure, the computer-implemented method may further include determining if the switch has transitioned from the second condition to the first condition. In a case where it is determined that the switch has not transitioned from the second condition back to the first condition the computer-implemented method further includes: maintaining the second operating mode. In a case where it is determined that the switch has transitioned from the second condition back to the first condition the computer-implemented method further includes: determining a prior duration of the first operating mode, switching from the second operating mode to the first operating mode, and adjusting the first operating mode based on the second pre-determined time.

In an aspect of the present disclosure, the method may further include providing an indication to a user that the second operating mode is initiated.

In another aspect of the present disclosure, the indication may include at least one of an audio alert or a visual alert.

In a further aspect of the present disclosure, the first operating mode may include a low power level, and the second operating mode may include a high power level. The high power level may be higher than a power level of the first operating mode.

In a further aspect of the present disclosure, the first operating mode may include a low power level, and the second operating mode may include a high power level.

BRIEF DESCRIPTION OF THE DRAWINGS

The above and other aspects and features of the present disclosure will become more apparent in light of the following detailed description when taken in conjunction with the accompanying drawings wherein like reference numerals identify similar or identical elements.

DETAILED DESCRIPTION

Figure 1:
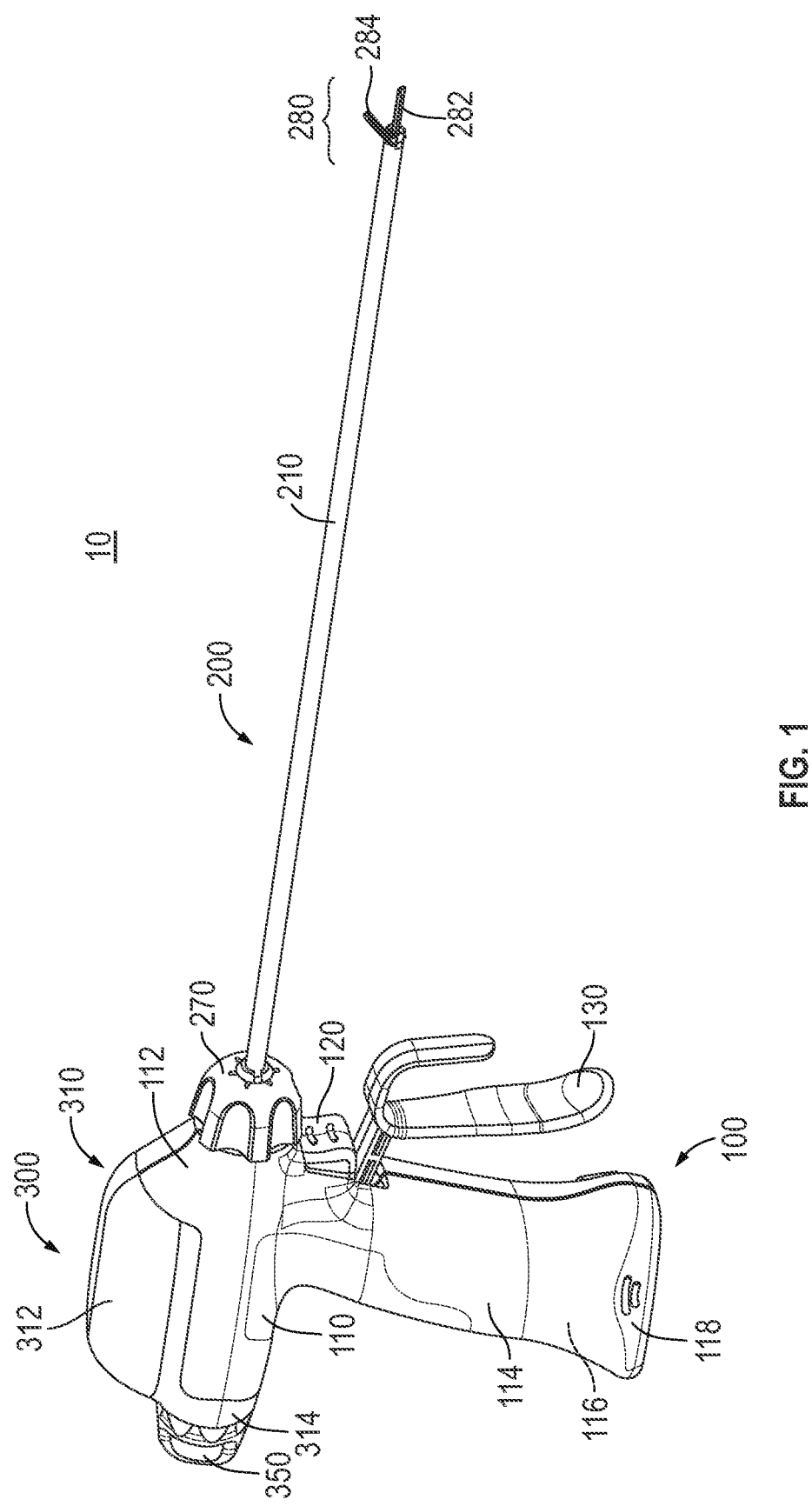
FIG. 1 is a side, perspective view of an ultrasonic surgical instrument provided in accordance with the present disclosure.
Figure 2:
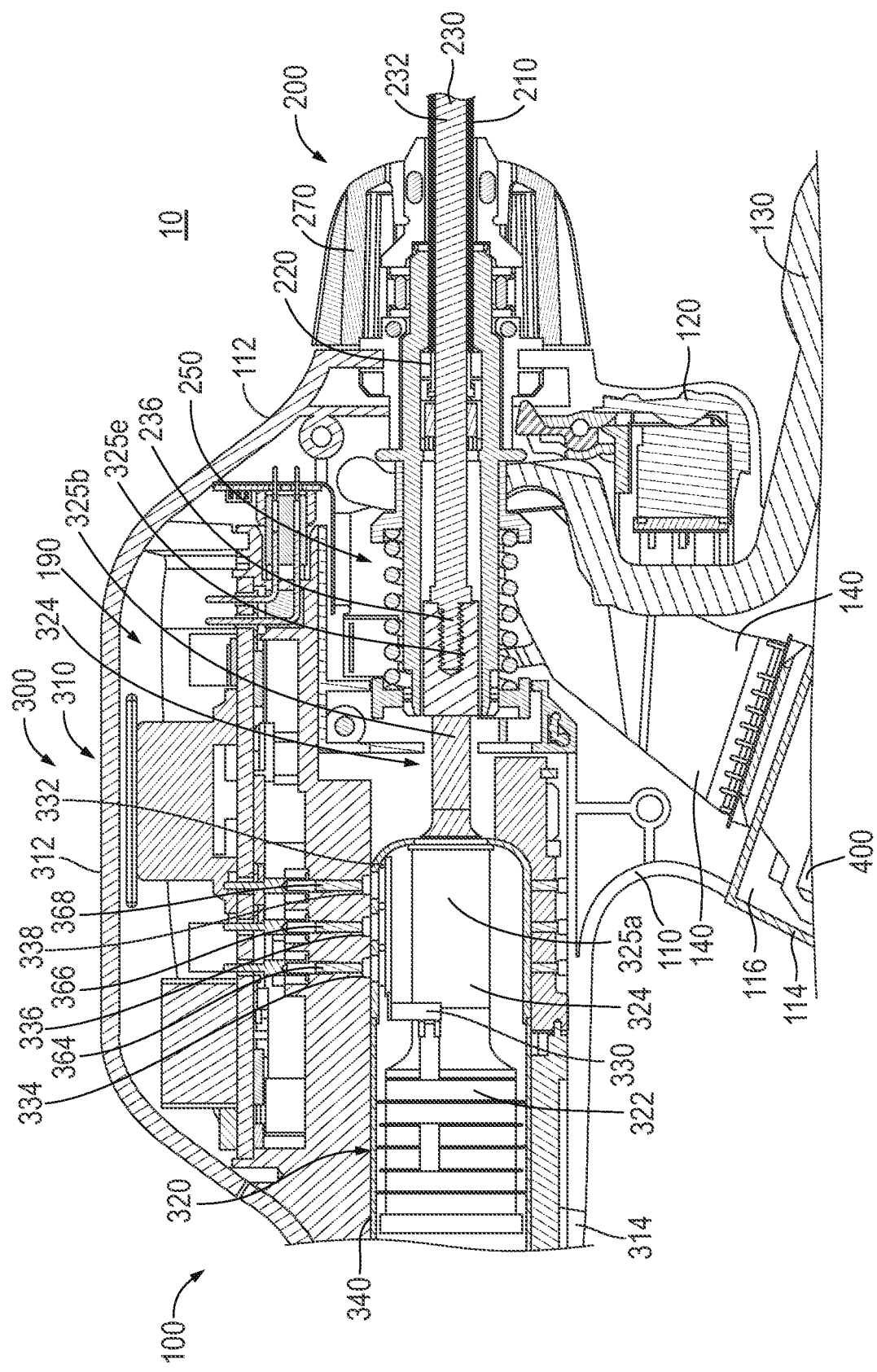
FIG. 2 is an enlarged, side, longitudinal, cross-sectional view of a proximal portion of the ultrasonic surgical instrument of FIG. 1.

Referring to FIGS. 1 and 2, an ultrasonic surgical instrument provided in accordance with the present disclosure is shown generally identified by reference numeral 10. Ultrasonic surgical instrument 10 includes a handle assembly 100 and an elongated assembly 200 extending distally from handle assembly 100. Handle assembly 100 includes a housing 110 defining a body portion 112 and a fixed handle portion 114. Handle assembly 100 further includes an activation button 120 and a clamp trigger 130.

Body portion 112 of housing 110 is configured to support an ultrasonic transducer and generator assembly ("TAG") 300 including a generator assembly 310 and an ultrasonic transducer assembly 320. TAG 300 may be permanently engaged with body portion 112 of housing 110 or removable therefrom. Generator assembly 310 includes a housing 312 configured to house the internal electronics of generator assembly 310, and a cradle 314 configured to rotatably support ultrasonic transducer assembly 320. Alternatively, generator assembly 310 may be remotely disposed and coupled to ultrasonic surgical instrument 10 by way of a surgical cable. TAG 300 is described in greater detail below.

Fixed handle portion 114 of housing 110 defines a compartment 116 configured to receive a battery assembly 400 (FIG. 2) and a door 118 configured to enclose compartment 116. An electrical connection assembly 140 is disposed within housing 110 of handle assembly 100 and serves to electrically couple activation button 120, generator assembly 310 of TAG 300, and battery assembly 400 with one another when TAG 300 is supported on or in body portion 112 of housing 110 and battery assembly 400 is disposed within compartment 116 of fixed handle portion 114 of housing 110, thus enabling activation of ultrasonic surgical instrument 10 in response to depression of activation button 120. More specifically, when activation button 120 is activated in an appropriate manner, an underlying two-mode switch assembly of activation button 120 is activated to supply power from the battery to TAG 300 in a first mode or a second mode, e.g., a "LOW" power mode or a "HIGH" power mode, depending upon the manner of activation button 120. Activation button 120 may move in the same direction from an off position, to the "LOW" power mode, to the "HIGH" power mode or may move therebetween in any other suitable manner. It is contemplated that the "LOW" and "HIGH" power modes can be activated via independent switches. One skilled in the art can apply the methods described herein to a system with independent switches for "LOW" and "HIGH" power modes.

In embodiments where generator assembly 310 is remote from ultrasonic surgical instrument 10, battery assembly 400 and the configuration of fixed handle portion 114 for receiving battery assembly 400 need not be provided, as generator assembly 310 may be powered by a standard wall outlet or other power source.

Referring still to FIGS. 1 and 2, elongated assembly 200 of ultrasonic surgical instrument 10 includes an outer drive sleeve 210, an inner support sleeve 220 disposed within outer drive sleeve 210, a waveguide 230 extending through inner support sleeve 220, a drive assembly 250, a rotation knob 270, and an end effector 280 including a blade 282 and a jaw 284. A proximal portion of outer drive sleeve 210 is operably coupled to clamp trigger 130 of handle assembly 100 via drive assembly 250, while a distal portion of outer drive sleeve 210 is operably coupled to jaw 284. As such, clamp trigger 130 is selectively actuatable to thereby move outer drive sleeve 210 about inner support sleeve 220 to pivot jaw 284 relative to blade 282 of end effector 280 from a spaced-apart position to an approximated position for clamping tissue between jaw 284 and blade 282. Drive assembly 250 provides a force-limiting feature whereby the clamping pressure applied to tissue is limited to a particular clamping pressure or particular clamping pressure range. Rotation knob 270 is rotatable in either direction to rotate elongated assembly 200 in either direction relative to handle assembly 100.

Waveguide 230 extends through inner support sleeve 220. Waveguide 230 defines a body 232 and a blade 282 extending from the distal end of body 232. Blade 282 serves as the blade of end effector 280. Waveguide 230 further includes a proximal threaded male connector 236 configured for threaded engagement within threaded female receiver 325e of nose 325b of ultrasonic horn 324 of ultrasonic transducer assembly 320 such that ultrasonic vibrations produced by ultrasonic transducer assembly 320 are transmitted along waveguide 230 to blade 282 for treating tissue clamping between blade 282 and jaw 284 or positioned adjacent to blade 282.

Referring to FIG. 2, ultrasonic transducer assembly 320 includes a piezoelectric stack 322, an ultrasonic horn 324, a bolt 328, a proximal nut 329, first and second electrode assemblies 330, a contact assembly 332, and a casing 340. Bolt 328 secures piezoelectric stack 322 between ultrasonic horn 324 and a proximal nut 329. First and second electrode assemblies 330 are interdisposed between the piezoelectric elements 323 of piezoelectric stack 322 and connect to contact assembly 332. Contact assembly 332 enables communication of drive and/or data signals through casing 340, e.g., between piezoelectric stack 322 and generator assembly 310. Casing 340, together with ultrasonic horn 324, houses piezoelectric stack 322, a portion of ultrasonic horn 324, bolt 328, proximal nut 329, first and second electrode assemblies 330, and a portion of contact assembly 332.

Ultrasonic transducer assembly 320 further includes a rotation knob 350 (FIG. 1) mounted on or formed with casing 340 at the proximal end of casing 340. Rotation knob 350 is accessible from the exterior of handle assembly 100 and is configured for manual rotation to rotate ultrasonic transducer assembly 320 relative to generator assembly 310 and housing 110.

Continuing with reference to FIGS. 1 and 2, generator assembly 310 includes a plurality of ring contacts 364, 366, 368 surrounding ultrasonic transducer assembly 320 and disposed in slidable contact with corresponding slip contacts 334, 336, 338, respectively, of contact assembly 332 of ultrasonic transducer assembly 320. Thus, ring contacts 364, 366, 368 and respective slip contacts 334, 336, 338 define slip ring contact assemblies that enable drive and/or data signals to be communicated between generator assembly 310 and piezoelectric stack 322 of ultrasonic transducer assembly 320 regardless of the rotational orientation of ultrasonic transducer assembly 320 relative to generator assembly 310. More specifically, with respect to drive signal communication, the first of the electrode assemblies 330 includes at least one electrode disposed between the piezoelectric elements 323 of piezoelectric stack 322 and an electrode connector connecting the at least one electrode with slip contact 334 which, in turn, is disposed in contact with ring contact 364. The second of the electrode assemblies 330 includes at least one other electrode disposed between the piezoelectric elements 323 of piezoelectric stack 322 and an electrode connector connecting the at least one other electrode with slip contact 336 which, in turn, is disposed in contact with ring contact 366. As such, a drive signal voltage may be applied from generator assembly 310 across the piezoelectric elements 323 of the piezoelectric stack 322 via the electrodes. The piezoelectric stack 322, in turn, converts the applied voltage into mechanical energy, in the form of ultrasonic vibrations, that is transmitted to ultrasonic horn 324.

With respect to data signal communication, a controller 190 disposed within generator assembly 310 (or within ultrasonic transducer assembly 320) is in communication with ultrasonic horn 324 (and/or other portions of ultrasonic transducer assembly 320). The controller 190, more specifically, may be a microprocessor chip or other suitable chip with sensory circuitry to detect various conditions, parameters, properties, etc. of piezoelectric stack 322, ultrasonic horn 324, and/or other portions of ultrasonic transducer assembly 320. The controller 190 may be configured to sense, for example, a frequency, amplitude, impedance, and/or temperature of ultrasonic horn 324 (or other portion of ultrasonic transducer assembly 320); the number of times ultrasonic transducer assembly 320 has been activated, the duration of activation ultrasonic transducer assembly 320, etc. The controller 190 may additionally or alternatively include a memory storing information relating to ultrasonic transducer assembly 320 such as, for example, model, serial number, manufacture date, calibration and/or testing information, manufacturer setting information, etc. In embodiments where the controller 190 includes sensor circuitry, the memory may also store the sensed data.

The controller 190 includes associated electrical connectors that are coupled to ring contact 368 which, in turn, is disposed in contact with lip contact 338 of contact assembly 332 to enable communication of data signals between ultrasonic transducer assembly 320 and ultrasonic generator assembly 310.

Figure 3:
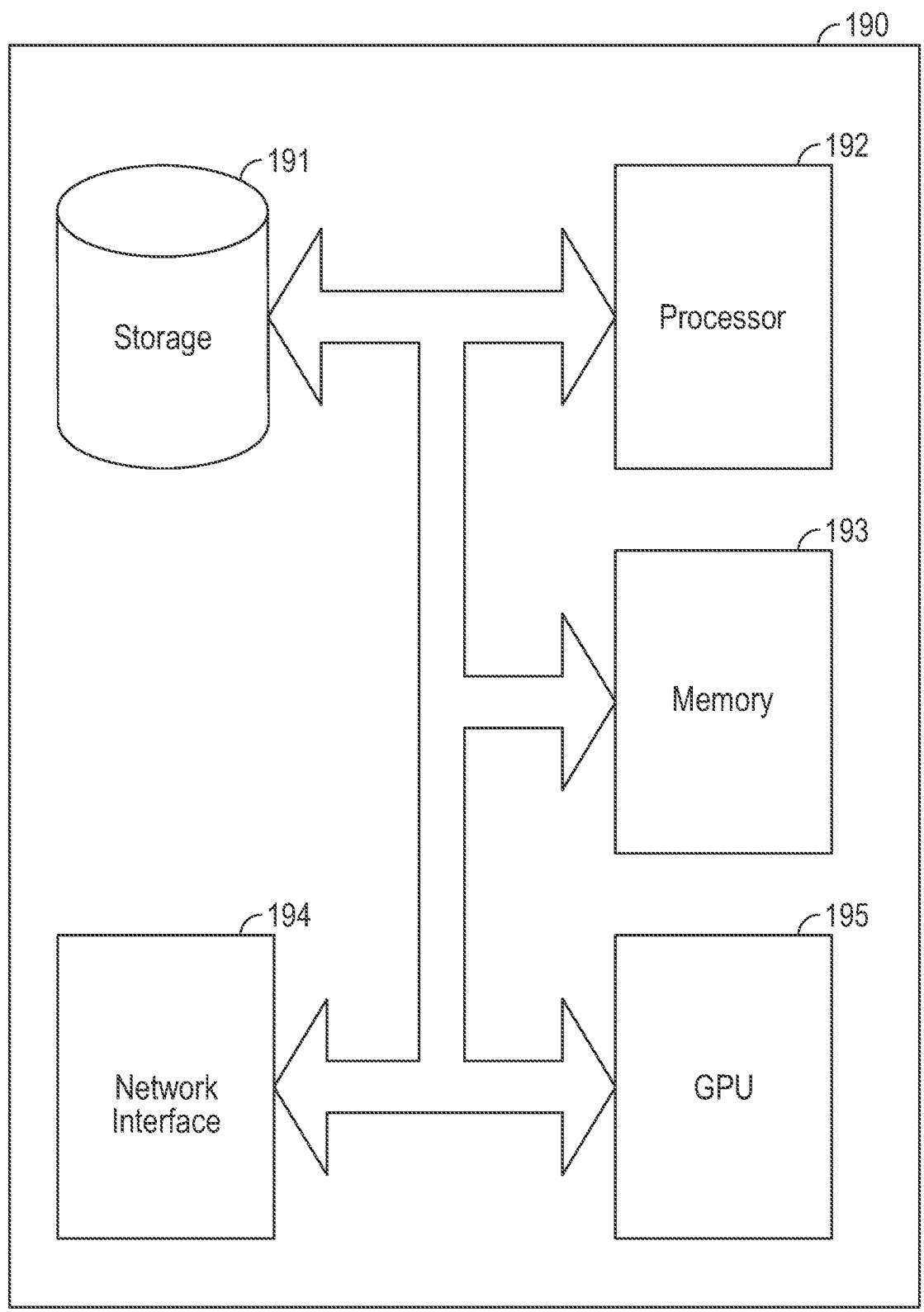
FIG. 3 is a block diagram of a controller of the generator of the ultrasonic surgical instrument of FIG. 1.

Referring to FIG. 3, a block diagram of controller 190 is shown. The controller 190 includes a processor 192, a computer-readable storage medium (e.g., a storage device 191), and/or a memory 193. In various embodiments, the processor 192 may be another type of processor such as, without limitation, a digital signal processor, a microprocessor, an ASIC, a field-programmable gate array (FPGA), a central processing unit (CPU), and/or a graphical processing unit (GPU) 195.

The memory 193, may be a volatile type memory, e.g., RAM, or a non-volatile type memory, e.g., flash media, disk media, etc. The memory 193 stores suitable instructions, to be executed by the processor 192, for example, for determining the mode of the surgical instrument and accessing storage device 191 of the controller 190. Storage device 191 of controller 190 stores one or more algorithms configured to control the delivery of ultrasonic surgical energy. Although illustrated as part of generator assembly 310, it is also contemplated that controller 190 be remote from generator assembly 310, e.g., on a remote server, and accessible by generator assembly 310 via a wired or wireless connection. In embodiments where controller 190 is remote, it is contemplated that controller 190 may be accessible by and connected to multiple generator assemblies 310.

In various embodiments, the memory 193 can be separate from the controller 190 and can communicate with the processor 192 through communication buses of a circuit board and/or through communication cables such as serial ATA cables or other types of cables. In various embodiments, the controller 190 may include a network interface 194 to communicate with other computers or a server.

Figure 4:
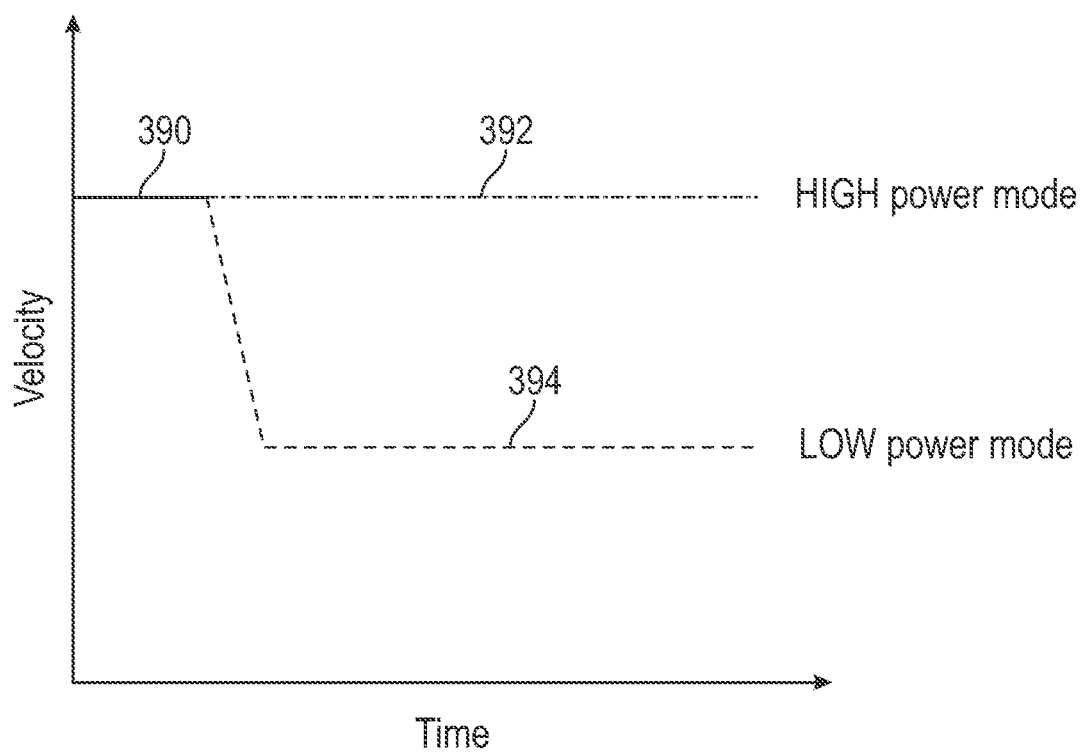
FIG. 4 is a graph depicting ultrasonic blade velocity vs time in a first mode and a second mode in accordance with the disclosure.

Referring now to FIG. 4, there is shown a graph of velocity vs time for the instrument 10 and 210 of FIGS. 1 and 2. Ultrasonic vibrations produced by ultrasonic transducer assembly 320 are transmitted along waveguide 230 to blade 282 for treating tissue clamping between blade 282 and jaw 284 or positioned near blade 282 (for clamp-less tissue treatment). In aspects of the disclosure, in a first operating mode (e.g., a "LOW" power mode), a velocity of the blade 282 is a low velocity 394. In aspects of the disclosure, the "LOW" power mode may consist of various power levels in the form of the velocity of the blade 282. In aspects of the disclosure, in a second operating mode (e.g., a "HIGH" power mode), the velocity of the blade 282 is at a high velocity 392 that is higher than the velocity in the "LOW" power mode. In aspects of the disclosure, the "HIGH" power mode may consist of various power levels in the form of the velocity of the blade 282 that is higher than the "LOW" power mode.

For example, during a surgical procedure, upon activation in either the "LOW" power mode or the "HIGH" power mode, the velocity of the blade 282 is initially high 390, e.g., for an initial period. If the clinician activated the activation button 120 in the second condition, corresponding to the second operating mode (e.g., the "HIGH" power mode), the velocity of the blade 282 will remain high 392 after the initial period. If, on the other hand, the clinician activated the activation button 120 in the first condition, corresponding to the first operating mode (e.g., the "LOW" power mode), the velocity of the blade 282 will drop to low 394 after the initial period. Of course, the clinician may transition the activation button 120 between the first and second conditions during use.

Figure 5:
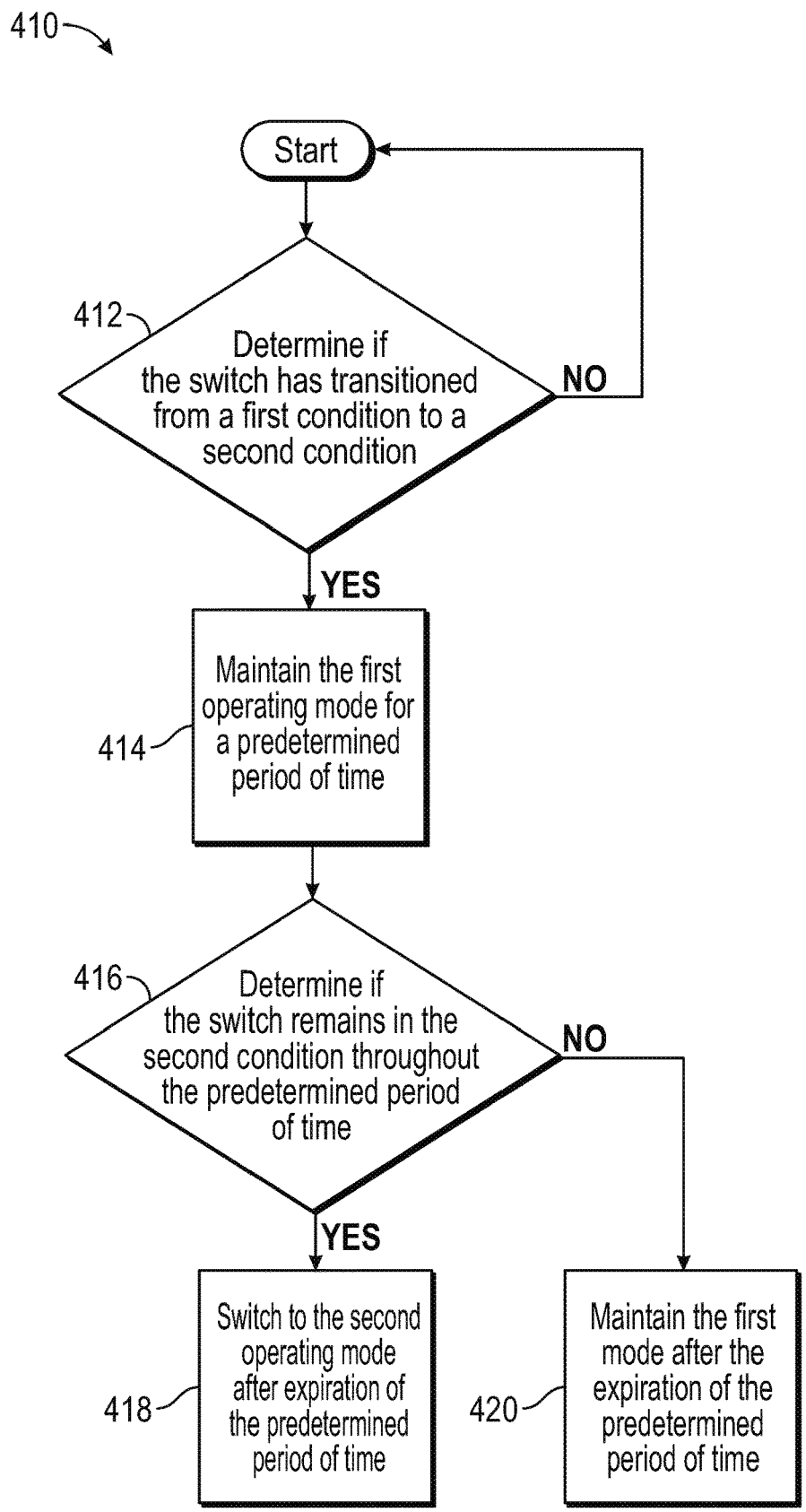
FIG. 5 is a flowchart of a method for operating an ultrasonic surgical device in accordance with the disclosure.

Referring now to FIG. 5, there is shown a flow diagram of a computer-implemented method 410 for tissue treatment using an ultrasonic surgical instrument, e.g., ultrasonic surgical instrument 10 (FIG. 1), including a switch, e.g., associated with activation button 120 (FIG. 1), that is configured to be activated in two or more modes, e.g., a "LOW" power mode and a "HIGH" power mode. Method 410, more specifically, applies where a clinician transitions the switch between first and second conditions, corresponding to first and second modes of operation, during activation.

Initially, the switch is activated in a first condition, corresponding to a first operating mode. At step 412 a controller, e.g., the controller 190 (FIG. 2), determines whether the switch, e.g., associated with activation button 120 (FIG. 1), has transitioned from the first condition to a second condition. In aspects of the disclosure, the first condition corresponds to a first operating mode which may include a "LOW" power mode. In aspects of the disclosure, the second condition corresponds to a second operating mode which may include a "HIGH" power mode. In aspects of the disclosure, the "HIGH" power mode may consist of various power levels in the form of the velocity of the active blade 282 that is higher than the "LOW" power mode.

If the controller determines that the switch has not transitioned from the first condition to the second condition, the method returns to the start. At step 414, if the controller determines that the switch has transitioned from the first condition to the second condition, the controller maintains the first operating mode for a pre-determined period of time. In aspects of the disclosure, the instrument, e.g., instrument 10 (FIG. 1), may provide an indication to the user that the switch has been switched from the first condition to the second condition. The indication may include a tactile alert (e.g., vibration), an audio alert (e.g., one or more audio tones) and/or a visual alert (e.g., an indication light/LED, and/or text-based notification).

Next, at step 416, the controller determines whether the switch remains in the second condition throughout the pre-determined period of time (e.g., 400 milliseconds). If YES at step 416, then at step 418 the controller switches to the second operating mode after the expiration of the pre-determined period of time. In aspects of the disclosure, the instrument, e.g., instrument 10 (FIG. 1), may provide an indication to the user that the operating mode has switched to the second operating mode. In aspects of the disclosure, the indication may include an audio alert (e.g., one or more audio tones) and/or a visual alert (e.g., an indication light/LED, and/or text-based notification).

If NO at 416, meaning the switch returned to the first condition during the pre-determined period of time, at step 420 the controller maintains the first operating mode after the expiration of the pre-determined period of time.

In use, for example, a clinician may transition the activation button 120 (FIG. 1) and, thus, the underlying switch, from the first condition (e.g., corresponding to the "LOW" power mode) to the second condition (e.g., corresponding to the "HIGH" power mode). However, no actual change in the operating mode (e.g., from the "LOW" power mode to the "HIGH" power mode) is yet effected. Rather, the operating mode is maintained for a predetermined period of time and an audio and/or other indication is provided to the clinician letting the clinician know that the switch has been transitioned to a different condition. The predetermined period of time is sufficiently long, e.g., in embodiments, at least 300 ms, at least 400 ms, or at least 500 ms, to enable the clinician, in a case where the clinician did not intend to transition to the second condition corresponding to the "HIGH" power mode, to transition the switch back to the first condition corresponding to the "LOW" power mode without the operating mode ever leaving the "LOW" power mode. On the other hand, if the clinician did intend to switch to the second condition corresponding to the "HIGH" power mode, as recognized by the clinician maintaining the switch in the second condition despite the indicator, the operating mode is switched to the "HIGH" power mode upon expiration of the predetermined period of time.

Figure 6:
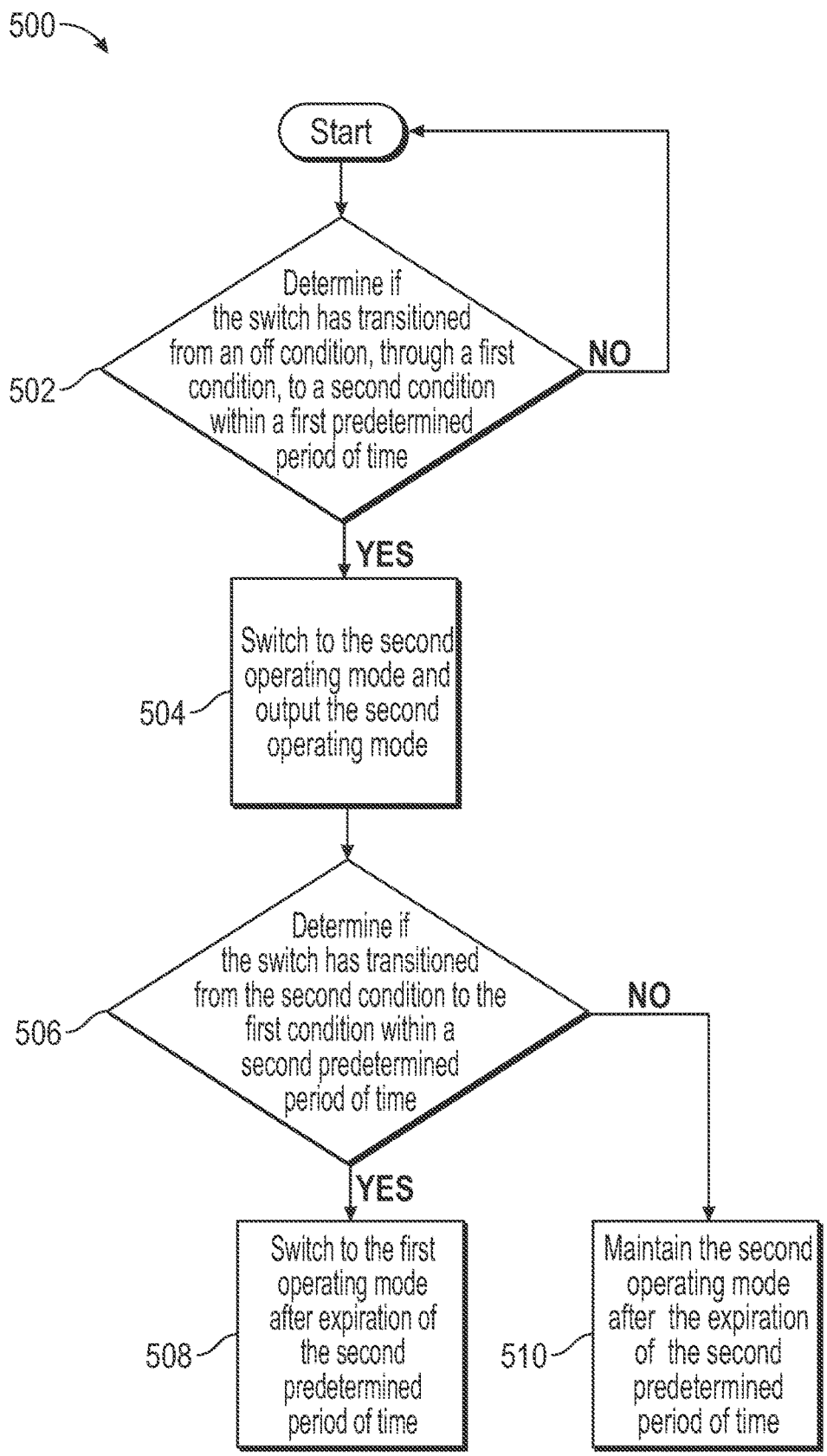
FIG. 6 is a flowchart of a method for operating an ultrasonic surgical device in accordance with the disclosure.

Referring now to FIG. 6, there is shown another flow diagram of a computer-implemented method 500 for tissue treatment using an ultrasonic surgical instrument, e.g., ultrasonic surgical instrument 10 (FIG. 1), including a switch, e.g., underlying activation button 120 (FIG. 1), that is configured to be activated in two or more modes, e.g., a "LOW" power mode and a "HIGH" power mode. Method 500, more specifically, applies where a clinician transitions the activation button from an off condition, through a first condition, to a second condition (where the first and second conditions correspond to first and second modes of operation during activation).

Initially, at step 502 a controller, e.g., controller 190 (FIG. 2), determines whether the switch, e.g., corresponding to activation button 120 (FIG. 0.1) has transitioned from an off condition, through a first condition, to a second condition within a first predetermined period of time. In aspects of the disclosure, the first condition corresponds to a first operating mode which may include a "LOW" power mode. In aspects of the disclosure, the second condition corresponds to a second operating mode which may include a "HIGH" power mode. In aspects of the disclosure, the "HIGH" power mode may consist of various power levels in the form of the velocity of the blade 282 (FIG. 1) that is higher than the "LOW" power mode.

At step 504, if the controller determines that the switch has transitioned from the off condition, through the first condition, to the second condition within a first predetermined period of time, the controller will activate the second operating mode after the first predetermined period of time. In aspects of the disclosure, the instrument 10 (FIG. 1) may provide an indication to the user that the second operating mode has been activated, e.g., via an audio alert (e.g., one or more audio tones) and/or a visual alert (e.g., an indication light/LED, and/or text-based notification).

Next, at step 506, the controller determines whether the switch has transitioned from the second condition to the first condition within a second predetermined period of time immediately subsequent to the first predetermined period of time. If YES at step 506, then at step 508 the controller switches to the first operating mode after the expiration of the second pre-determined period of time. In aspects of the disclosure, the instrument 10 may provide an indication to the user that the operating mode has switched to the first operating mode. In aspects of the disclosure, the indication may include an audio alert (e.g., one or more audio tones) and/or a visual alert (e.g., an indication light/LED, and/or text-based notification).

If NO at 506, and the switch remains in the second condition, at step 510 the controller maintains the second operating mode after the expiration of the second pre-determined time.

In use, for example, a clinician may transition the activation button 120 (FIG. 1) and, thus, the underlying switch, from an off condition, through the first condition (e.g., corresponding to the "LOW" power mode), to the second condition (e.g., corresponding to the "HIGH" power mode) within a first pre-determined period of time. Regardless of the particular condition intended, the "HIGH" power mode of operation is initiated after first the pre-determined period of time because, in embodiments, the velocity of the blade 282 is high for an initial period of activation in either the "LOW" power mode or the "HIGH" power mode (see FIG. 4). An audio and/or other indication is also provided to the clinician letting the clinician know that the switch has been transitioned to the second condition. The "HIGH" power mode of operation is initiated for a second predetermined period of time immediately subsequent to the first predetermined period of time. The second predetermined period of time is sufficiently long, e.g., in embodiments, at least 300 ms, at least 400 ms, or at least 500 ms, to enable the clinician, in a case where the clinician did not intend to transition to the second condition corresponding to the "HIGH" power mode, to transition the switch back to the first condition corresponding to the "LOW" power mode. If this is done, the operating mode switches to the second or "LOW" power mode after expiration of the second predetermined period of time and, thus, the result is as if the "LOW" power mode had been activated from the beginning. On the other hand, if the clinician did intend to switch to the second condition corresponding to the "HIGH" power mode, as recognized by the clinician maintaining the switch in the second condition through the second predetermined period of time despite the indicator, the operating mode is maintained in the "HIGH" power mode upon expiration of the second predetermined period of time.

Figure 7:
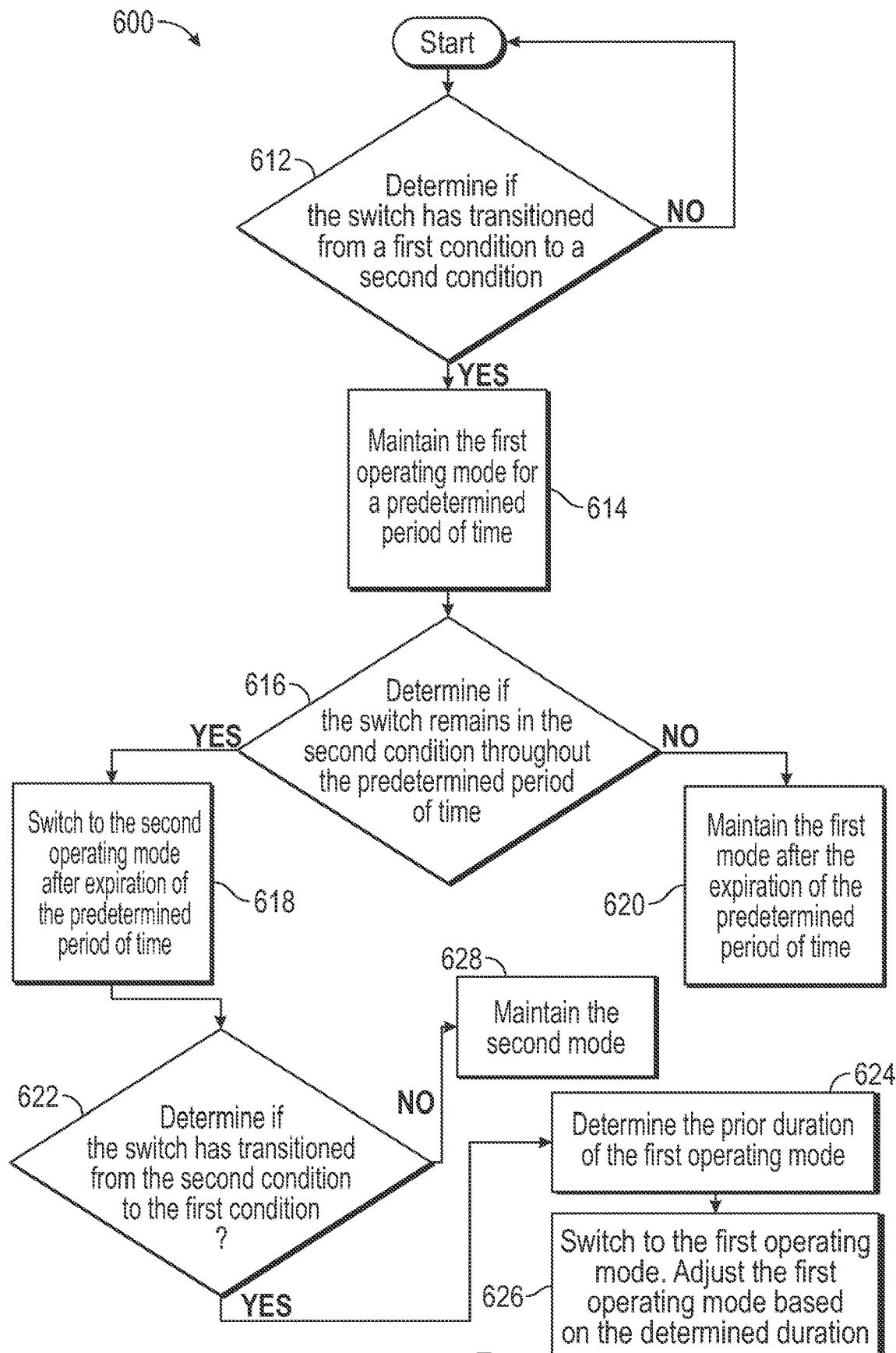
FIG. 7 is a flowchart of a method for operating an ultrasonic surgical device in accordance with the disclosure.

Referring now to FIG. 7, there is shown a flow diagram of a computer-implemented method 600 treatment using an ultrasonic surgical instrument, e.g., ultrasonic surgical instrument 10 (FIG. 1), including a switch, e.g., associated with activation button 120 (FIG. 1), that is configured to be activated in two or more modes, e.g., a "LOW" power mode and a "HIGH" power mode. Method 600, more specifically, applies where a clinician transitions the switch between first and second conditions, corresponding to first and second modes of operation, during activation.

Initially, the switch is activated in a first condition, corresponding to a first operating mode. At step 612 a controller, e.g., the controller 190 (FIG. 2), determines whether the switch, e.g., associated with activation button 120 (FIG. 1), has transitioned from the first condition to a second condition. In aspects of the disclosure, the first condition corresponds to a first operating mode which may include a "LOW" power mode. In aspects of the disclosure, the second condition corresponds to a second operating mode which may include a "HIGH" power mode. In aspects of the disclosure, the "HIGH" power mode may consist of various power levels in the form of the velocity of the active blade 282 that is higher than the "LOW" power mode.

If the controller determines that the switch has not transitioned from the first condition to the second condition, the method returns to the start. At step 614, if the controller determines that the switch has transitioned from the first condition to the second condition, the controller maintains the first operating mode for a pre-determined period of time. In aspects of the disclosure, the instrument, e.g., instrument 10 (FIG. 1), may provide an indication to the user that the switch has been switched from the first condition to the second condition. The indication may include a tactile alert (e.g., vibration), an audio alert (e.g., one or more audio tones) and/or a visual alert (e.g., an indication light/LED, and/or text-based notification).

Next, at step 616, the controller determines whether the switch remains in the second condition throughout the pre-determined period of time (e.g., 400 milliseconds). If YES at step 616, then at step 618 the controller switches to the second operating mode after the expiration of the pre-determined period of time. In aspects of the disclosure, the instrument, e.g., instrument 10 (FIG. 1), may provide an indication to the user that the operating mode has switched to the second operating mode. In aspects of the disclosure, the indication may include an audio alert (e.g., one or more audio tones) and/or a visual alert (e.g., an indication light/LED, and/or text-based notification).

Next, at step 622, the controller determines if the switch has transitioned from the second condition to the first condition. If NO at 622, meaning that the switch remains in the second condition, then at step 628 the controller will maintain the second mode. If YES at 622, meaning that the switch has transitioned to the first condition, then at step 624 the controller determines the prior duration of the first operating mode. Next, at step 626 the controller switches to the first operating mode and adjusts the first operating mode based on the determined duration.

If NO at 616, meaning the switch returned to the first condition during the pre-determined period of time, at step 620 the controller maintains the first operating mode after the expiration of the pre-determined period of time.

While several embodiments of the disclosure have been detailed above and are shown in the drawings, it is not intended that the disclosure be limited thereto, as it is intended that the disclosure be as broad in scope as the art will allow and that the specification be read likewise. Therefore, the above description and accompanying drawings should not be construed as limiting, but merely as exemplifications of particular embodiments. Those skilled in the art will envision other modifications within the scope and spirit of the claims appended hereto.

What is claimed is:

1. A method for operating a surgical device, comprising:
    determining that a switch has transitioned from a first condition, corresponding to a first operating mode, to a second condition, corresponding to a second operating mode;
    in response to the determination that the switch has transitioned from the first condition to the second condition:
        maintaining the first operating mode for a pre-determined time;
    in a case where the switch remains in the second condition throughout the pre-determined time, switching to the second operating mode after expiration of the pre-determined time; and
    in a case where the switch returns to the first condition during the pre-determined time, maintaining the first operating mode after expiration of the pre-determined time.

2. The method of claim 1, further comprising providing an indication to a user that the second condition is initiated.

3. The method of claim 2, wherein the indication includes at least one of a tactile alert, an audio alert, or a visual alert.

4. The method of claim 1, wherein the first operating mode includes a low power level, and the second operating mode includes a high power level.

5. A method for operating a surgical device, comprising:
    determining that a switch has transitioned from an off condition, through a first condition corresponding to a first operating mode, to a second condition corresponding to a second operating mode within a first pre-determined time;
    in response to the determination that the switch has transitioned from the off condition through the first condition to the second condition within the first pre-determined time:
        outputting the second operating mode; and
        determining whether the switch has transitioned from the second condition back to the first condition within a second pre-determined time;
    in response to a determination that the switch has transitioned from the second condition back to the first condition within the second pre-determined time:
        switching from the second operating mode to the first operating mode after expiration of the second pre-determined time; and
    in response to a determination that the switch has not transitioned from the second condition back to the first condition within the second pre-determined time:
        maintaining the second operating mode after expiration of the second pre-determined time.

6. The method of claim 5, providing an indication to a user that the second condition is initiated.

7. The method of claim 6, wherein the indication includes at least one of a tactile alert, an audio alert, or a visual alert.

8. The method of claim 5, wherein the first operating mode includes a low power level, and the second operating mode includes a high power level.

9. The method of claim 5, further comprising:
    determining if the switch has transitioned from the second condition to the first condition;
    in response to a determination that the switch has not transitioned from the second condition back to the first condition:
        maintaining the second operating mode; and
    in response to a determination that the switch has transitioned from the second condition back to the first condition:
        determining a prior duration of the first operating mode;
        switching from the second operating mode to the first operating mode; and
        adjusting the first operating mode based on the second pre-determined time.

10. The method of claim 9, providing an indication to a user that the second operating mode is initiated.

11. The method of claim 10, wherein the indication includes at least one of an audio alert or a visual alert.

12. The method of claim 10, wherein the first operating mode includes a low power level, and the second operating mode includes a high power level.

13. A non-transitory computer-readable medium storing instructions which, when executed by a processor, cause the processor to perform a computer-implemented method for operating a surgical device, comprising:
    determining that a switch has transitioned from an off condition, through a first condition corresponding to a first operating mode, to a second condition corresponding to a second operating mode within a first pre-determined time;
    in response to the determination that the switch has transitioned from the off condition through the first condition to the second condition within the first pre-determined time:
        outputting the second operating mode; and
        determining whether the switch has transitioned from the second condition back to the first condition within a second pre-determined time;
    in response to a determination that the switch has transitioned from the second condition back to the first condition within the second pre-determined time:
        switching from the second operating mode to the first operating mode after expiration of the second pre-determined time; and
    in response to a determination that the switch has not transitioned from the second condition back to the first condition within the second pre-determined time:
        maintaining the second operating mode after expiration of the second pre-determined time.

14. The non-transitory computer-readable medium of claim 13, wherein the computer-implemented method further includes providing an indication to a user that the second condition is initiated.

15. The non-transitory computer-readable medium of claim 14, wherein the indication includes at least one of a tactile alert, an audio alert, or a visual alert.

16. The non-transitory computer-readable medium of claim 13, wherein the first operating mode includes a low power level, and the second operating mode includes a high power level.

17. The method of claim 1, further comprising:
- determining if the switch has transitioned from the second condition to the first condition;
- in response to a determination that the switch has not transitioned from the second condition back to the first condition:
  - maintaining the second operating mode; and
- in response to a determination that the switch has transitioned from the second condition back to the first condition:
  - determining a prior duration of the first operating mode;
  - switching from the second operating mode to the first operating mode; and
  - adjusting the first operating mode based on the prior duration.

18. The non-transitory computer-readable medium of claim 13, wherein the computer-implemented method further includes providing an indication to a user that the second operating mode is initiated.

19. The non-transitory computer-readable medium of claim 18, wherein the indication includes at least one of an audio alert or a visual alert.

20. The non-transitory computer-readable medium of claim 13, wherein the first operating mode includes a low power level, and the second operating mode includes a high power level, wherein the high power level is higher than a power level of the first operating mode.

* * * * *